(12) United States Patent
Ochiai et al.

(10) Patent No.: US 7,290,912 B2
(45) Date of Patent: Nov. 6, 2007

(54) THERMAL INSULATION STRUCTURE FOR VEHICLE ROOM LAMP

(75) Inventors: Hiroshi Ochiai, Kawagoe (JP); Yuji Shimoda, Kawagoe (JP)

(73) Assignee: Kabushiki Kaisha T an T, Kawagoe-Shi, Saitama Prefecture (JP)

( * ) Notice: Subject to any disclaimer, the term of this patent is extended or adjusted under 35 U.S.C. 154(b) by 91 days.

(21) Appl. No.: 11/239,007

(22) Filed: Sep. 30, 2005

(65) Prior Publication Data

US 2007/0025115 A1 Feb. 1, 2007

(30) Foreign Application Priority Data

Jul. 28, 2005 (JP) ............................. 2005-219412

(51) Int. Cl.
*B60Q 3/02* (2006.01)
(52) U.S. Cl. ...................................... 362/544; 362/549
(58) Field of Classification Search ................ 362/490, 362/488, 544, 549
See application file for complete search history.

(56) References Cited

U.S. PATENT DOCUMENTS

| | | | | |
|---|---|---|---|---|
| 3,358,134 A | * | 12/1967 | Gonyea ........................ 362/484 |
| 3,917,938 A | * | 11/1975 | Ferrada et al. ............... 362/277 |
| 4,499,528 A | * | 2/1985 | Hawlitzki .................... 362/275 |
| 4,584,631 A | * | 4/1986 | Cody et al. .................. 362/548 |
| 4,628,417 A | * | 12/1986 | Kaminski et al. ............ 362/485 |
| 4,760,500 A | * | 7/1988 | Peng ........................... 362/490 |
| 4,764,851 A | * | 8/1988 | Hartmann .................... 362/546 |
| 4,812,955 A | * | 3/1989 | Beswick et al. ............. 362/240 |
| 5,289,358 A | * | 2/1994 | Halemeier .................... 362/365 |
| 5,746,498 A | * | 5/1998 | Rogge .......................... 362/488 |
| 5,775,796 A | * | 7/1998 | Weber .......................... 362/496 |
| 6,022,131 A | * | 2/2000 | Morimoto et al. ........... 362/549 |
| 6,092,917 A | * | 7/2000 | Litke et al. .................. 362/490 |
| 7,114,833 B1 | * | 10/2006 | Pickett et al. ................ 362/373 |

FOREIGN PATENT DOCUMENTS

JP          6-16431          4/1994

* cited by examiner

*Primary Examiner*—Hargobind S. Sawhney
(74) *Attorney, Agent, or Firm*—Nixon & Vanderhye PC

(57) ABSTRACT

A vehicle lamp assembly includes a case, and a bulb cassette for mounting the a light bulb in the case. The case is formed of a resin material having a low thermal resistance and defines an interior space. The case includes at least one partition wall defining a planar partition wall surface to partition the interior space respectively into one and another chambers. The bulb cassette is received in an opening of the case for accommodating a light bulb within the one chamber thereof and includes at least one planar heat shield wall formed of a heat resistant resin which extends in adjacent contact along the planar partition wall surface so as to shield the at least one partition wall and the other chamber from heat generated by the light bulb in the one chamber.

5 Claims, 6 Drawing Sheets

THERMAL INSULATION STRUCTURE FOR VEHICLE ROOM LAMP

BACKGROUND OF THE INVENTION

1. Field of the Invention

The present invention relates to a vehicle room lamp to be mounted to an inner lining of a vehicle roof and, more specifically, to a thermal insulation structure of a vehicle room lamp for preventing a case from becoming damaged by heat from a light bulb stored in the case of the room lamp.

2. Description of the Related Art

In manufacture of a vehicle room lamp, polypropylene which is low in cost has been employed as a case material for reducing the cost. When a light bulb with high heat value is used in such a case, there was a problem such that a terminal strip for mounting the light bulb to the case is heated by heat from the light bulb, or portion of the case where the terminal strip is to be mounted is thermally deformed (melted) by direct heat irradiation from the light bulb, whereby the terminal strip comes apart from the case.

Therefore, in order to solve such a problem, there is a technique disclosed in Japanese Unexamined Utility Model Registration Application Publication No. 4-5082. This technique is such that a terminal strip for a light bulb is mounted to a bulb cassette formed of expensive resin having high thermal resistant property, and the bulb cassette is detachably mounted to the case. In this structure, the terminal strip is prevented from coming apart by thermal deformation caused by the light bulb thereby becoming a state in which the lamp cannot be lit.

In the bulb cassette in the related art as described above, it is possible to prevent the mounting fixture from coming off the case due to thermal deformation. However, when a space in the case for accommodating the light bulb is small, there arises a problem such that a wall surface which defines the space is thermally deformed by heat from the light bulb, whereby the product value is lowered, and in the worst case, the entire case may become unusable due to thermal deformation of the wall surface.

SUMMARY OF THE INVENTION

In order to solve the above-described problem, it is an object of the invention to provide a thermal insulation structure of a vehicle room lamp in which a heat shield wall is formed between the wall surface of the case and the light bulb so as to continue from the bulb cassette, and heat from the light bulb is shielded to prevent high heat from being transmitted to the case wall surface whereby thermal deformation of the case wall surface is prevented.

In order to achieve the above-described object, a first aspect of the invention is, in a case in which a case formed of resin material having low thermal resistant property such as polypropylene and a wall surface which is in the proximity with a light bulb built in the case exist, characterized in that a bulb cassette for mounting the light bulb in the case is formed of thermal resistant resin, and a heat shield wall interposed between the light bulb and the wall surface is formed so as to continue from the bulb cassette.

In the structure of the first aspect, preferably, the heat shield walls are formed on both sides of the light bulb.

In the structure of the first aspect, preferably, the heat shield wall is formed integrally with the bulb cassette.

In the structure of the first aspect, preferably, the bulb cassette is formed of nylon resin.

As described above, in the invention, since the bulb cassette for mounting the light bulb to the interior of the case is formed of thermal resistant resin and the heat shield wall is interposed between the light bulb and the wall surface so as to continue from the bulb cassette, thermal deformation of the wall surface which defines a space in the case for accommodating the light bulb is prevented, whereby lowering of the product value is prevented and effects to other components can be prevented.

By forming the heat shield walls on both sides of the light bulb, thermal deformation of two wall surfaces can be prevented, and by forming the heat shield wall integrally with the bulb cassette, reduction of the cost can effectively reduced in comparison with the case of adhering a separate member.

DESCRIPTION OF THE PREFERRED EMBODIMENTS

Figure 1:
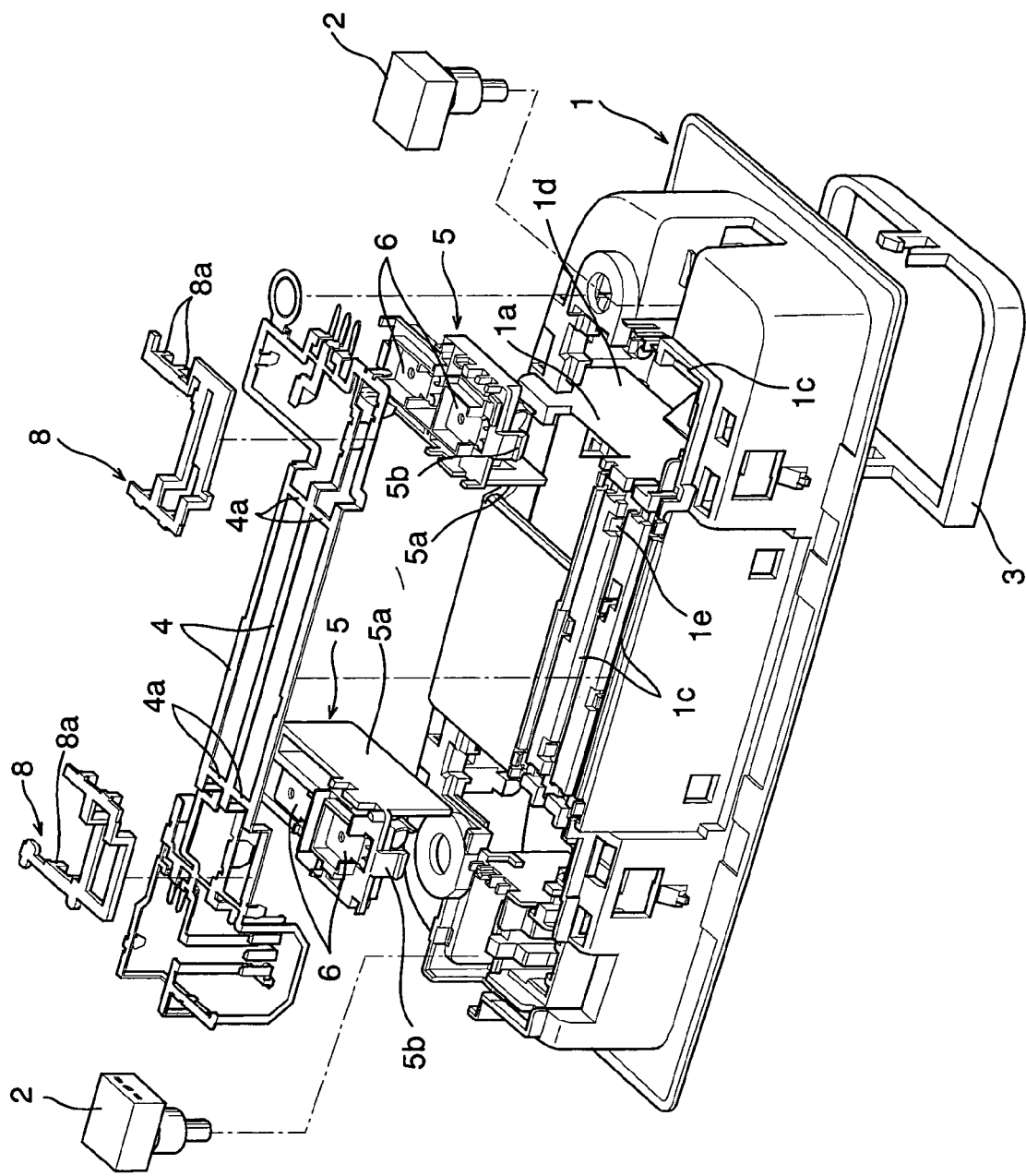
FIG. 1 is a general exploded perspective view of a thermal insulation structure of a vehicle illumination lamp according to the invention viewed from the back surface side of a case.
Figure 2:
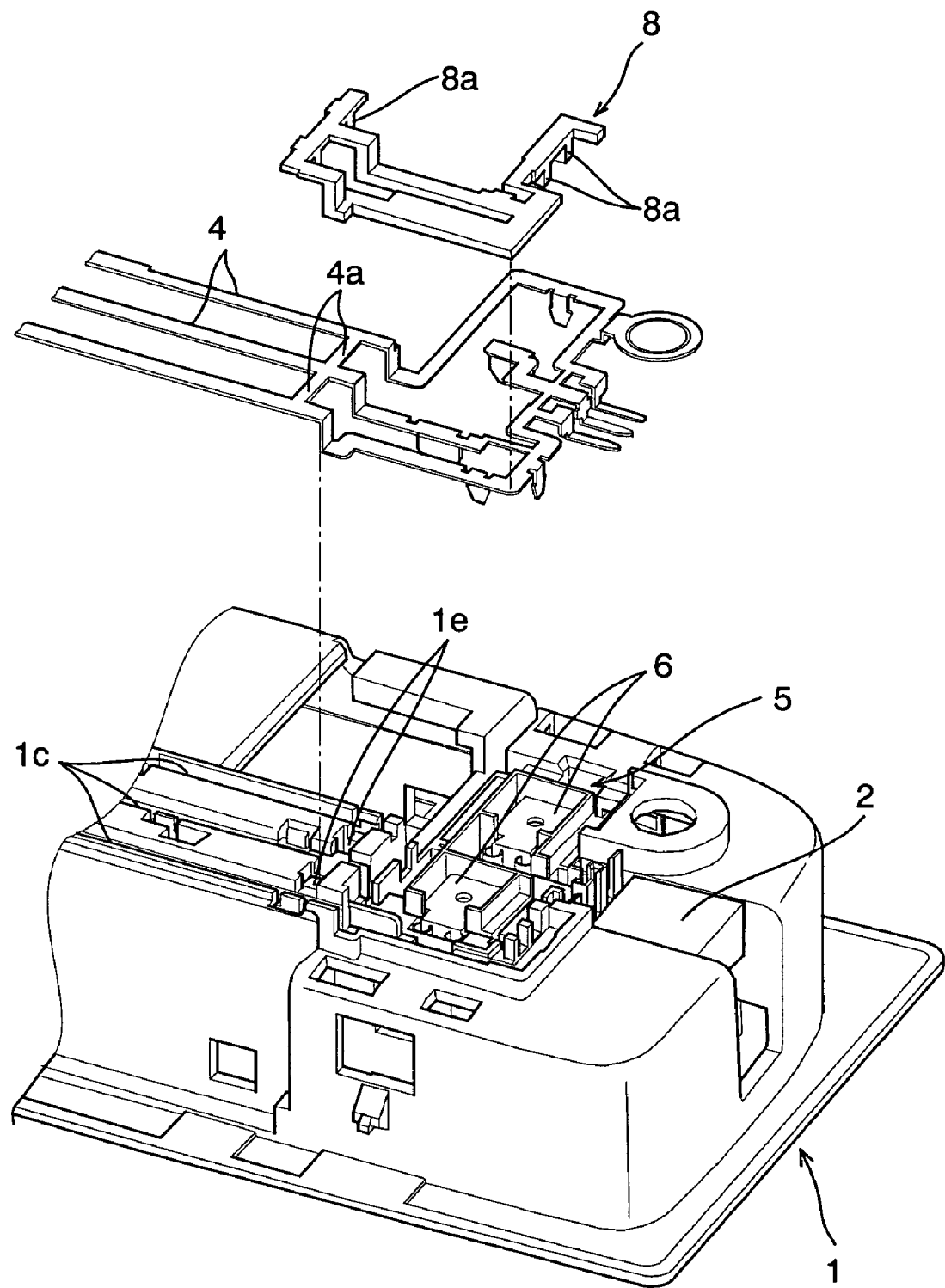
FIG. 2 is an exploded perspective view showing part of the structure shown in FIG. 1 in an enlarged scale.
Figure 3:
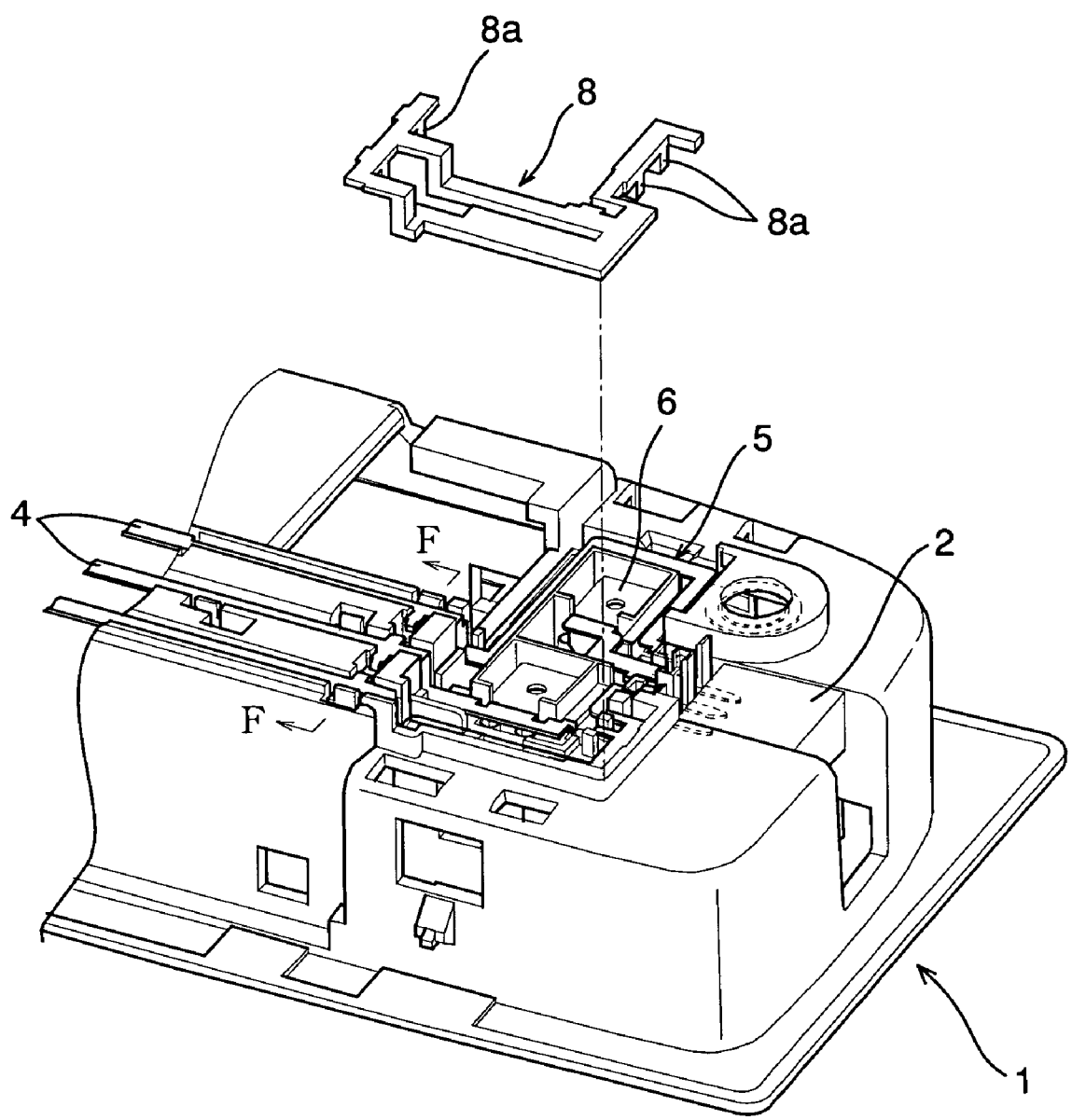
FIG. 3 is a perspective view of the structure in FIG. 1 in a state in which bus bars are mounted to the case.

The present invention is a structure in which a bulb cassette for mounting a light bulb to the interior of the case is formed of thermal resistant resin and a heat shield wall interposed between the light bulb and the wall surface is formed so as to continue from the bulb cassette.

EXAMPLE 1

Referring now to drawings, an embodiment of a thermal insulation structure of a vehicle room lamp according to the present invention will be described.

Reference numeral 1 is a case formed of resin whose material cost is low, such as polypropylene and partitioned into three chambers by two partitioning wall surfaces 1a. The two chambers on the left and right sides are chambers for storing map lamps, and a center chamber is a chamber for storing an illuminating unit for illuminating a portion of a cup holder provided between a driver's seat or a front passenger's seat, or a speaker or a microphone for a mobile phone.

Push switches 2 are mounted to a bottom plate of the left and right chambers respectively, and a lens 3 for turning the push switches on and off are rotatably mounted on the front surface side (the lower side in the drawing). A connector 1b to be connected with a battery of a vehicle is mounted on the bottom plate of the case 1, and grooves 1c for storing bus bars 4 for connecting the connector 1b with the push switch 2 and a terminal strip 6 for clamping and holding an electrode portion of a light bulb 7 described later are formed thereon.

Figure 4:
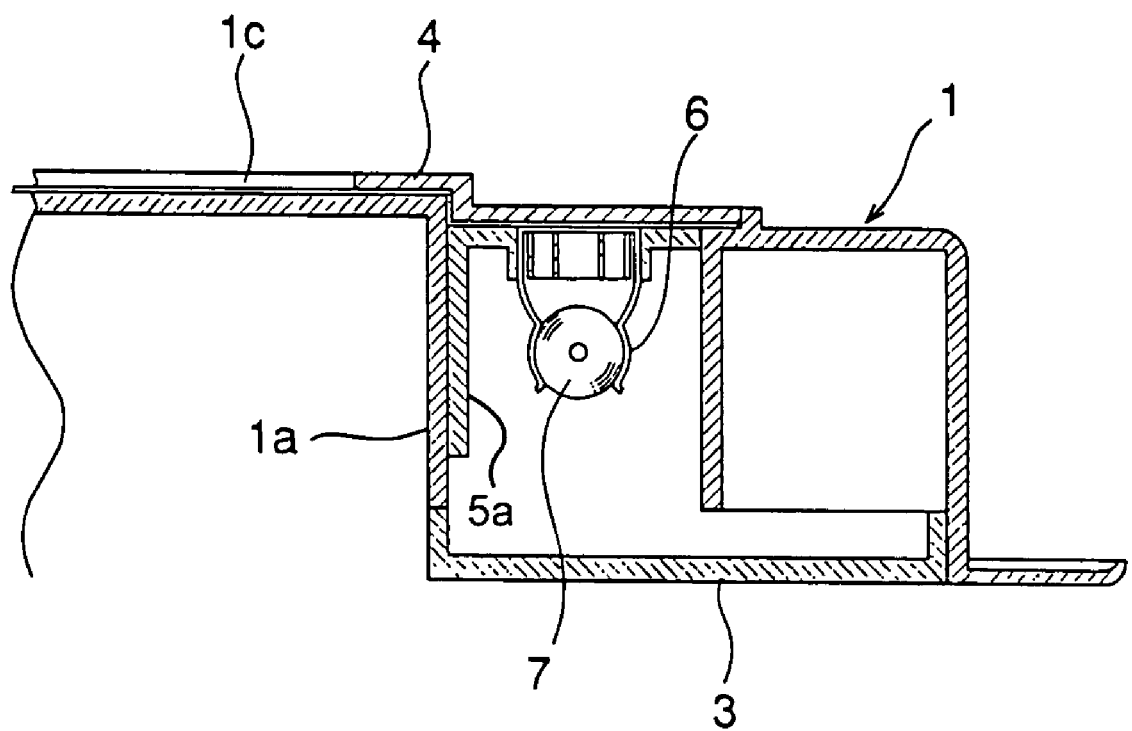
FIG. 4 is a cross-sectional view of a portion where the bulb cassette in an assembled state is mounted.

The bottom plate which constitutes the map lamp chambers in the case 1 is formed with openings 1d for detachably attaching bulb cassettes 5. The bulb cassette 5 is formed of thermal resistant resin, for example, of expensive nylon resin, so that the terminal strip 6 is detachably attached thereto. The bulb cassette 5 is formed integrally with a planar heat shield wall 5a which extends in adjacent contact along the planar wall surface 1a when the bulb cassette 5 is mounted to the opening 1d using a claw 5b. (See FIG. 4) The heat shield wall 5a is not necessarily required to be formed integrally with the bulb cassette 5, and may be integrated by means such as adhesion.

In this manner, even when the light bulb 7 is mounted to the terminal strip 6 provided in the bulb cassette 5, the bulb cassette 5 is mounted to the opening 1d of the case 1, power is supplied to the light bulb 7 to illuminate the same, heat from the light bulb 7 is increased, and the heat shield wall 5a formed of thermal resistant resin is heated, the heat shield wall 5a is prevented from being thermally deformed, and hence high heat is not transmitted to the wall surface 1a owing to the heat shield wall 5a. Therefore, the wall surface 1a is prevented from being thermally deformed.

The bus bars 4a for connecting the connector 1b with the push switch 2 and the terminal strip 6 are integrated by bridges 4a at the time of manufacture, and has a structure formed by fitting being fitted into the grooves 1c of the case 1, then cutting and bending upward the bridges to separate at positions of holes 1e formed at positions corresponding to the bridge 4a, so that each bus bar 4 establishes an independent circuit (for example, Japanese Unexamined Patent Application Publication No. 2001-180372).

Reference numeral 8 designates an insulating member formed of flexible resin for covering portions where the bus bars are arranged close to each other. The insulating member 8 is formed with a plurality of projections 8a to be fitted into the holes 1e of the case 1. The bus bars 4 are first fitted to the grooves 1c and, in the separated state by being cut and bent upward in the holes, the insulating members 8 are fitted into the grooves 1c, and then the projections 8a are fitted and fixed to the holes 1e, whereby the upper surfaces of the bus bars 4 which are close to each other are covered.

Therefore, even though carbon fibers (several millimeters in length, generally) contained in the inner lining fall on the bottom surface side of the case 1 when the case is mounted to a hole formed on an inner lining of the vehicle, since the upper surfaces of the bus bars whose mutual distance is reduced are covered by the insulating members 8, the bus bars are prevented from being short-circuited.

Figure 6:
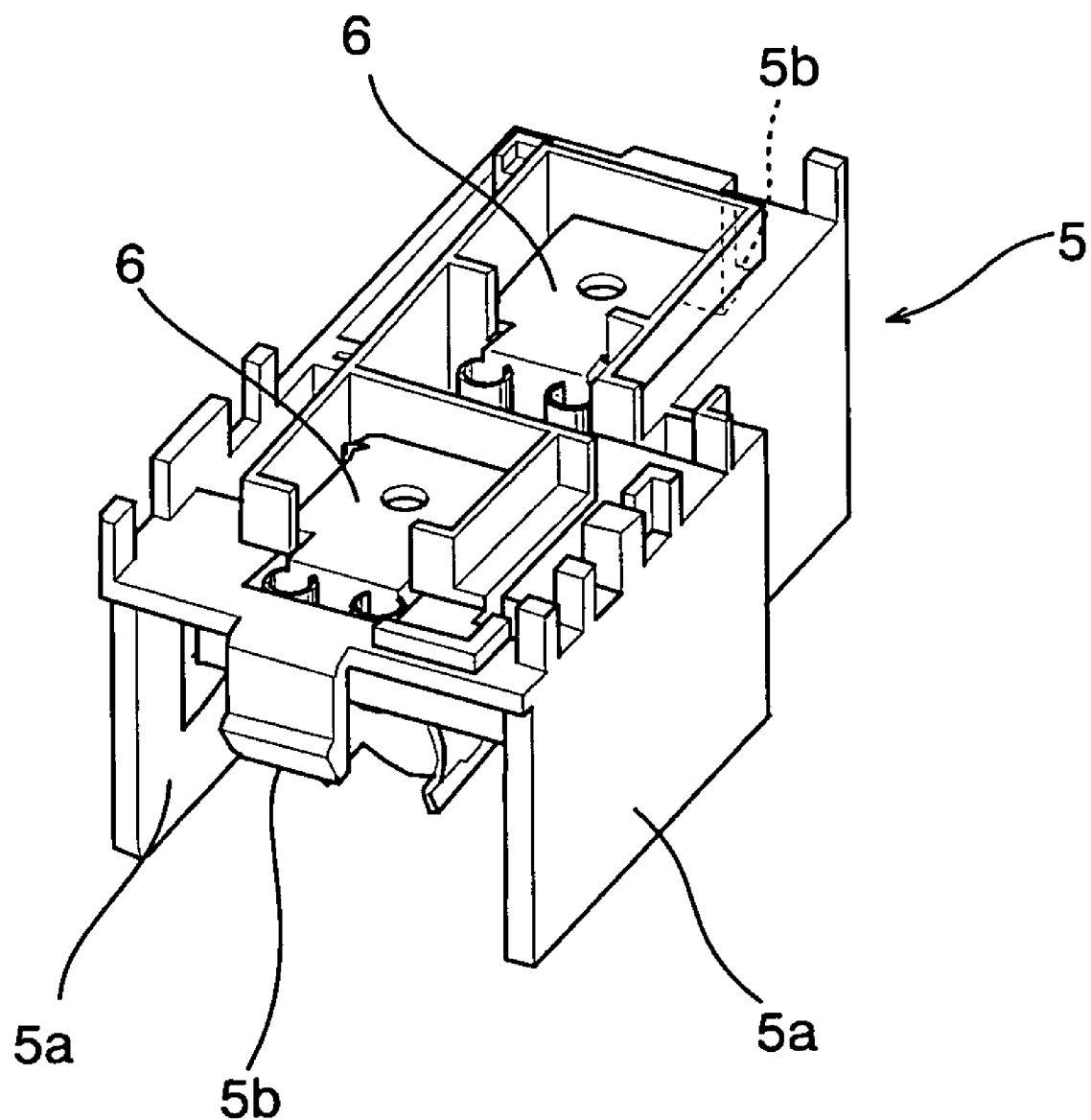
FIG. 6 is a perspective view of another embodiment of the bulb cassette.

Although the structure in which the single heat shield wall 5a is formed in the bulb cassette 5 for preventing thermal deformation of the single wall surface 1a in the embodiment described above, it is also possible to form two of the heat shield wall 5a as shown in FIG. 6 to prevent thermal deformation of the two wall surfaces opposed to each other with the intermediary of the light bulb 7.

Figure 5A:
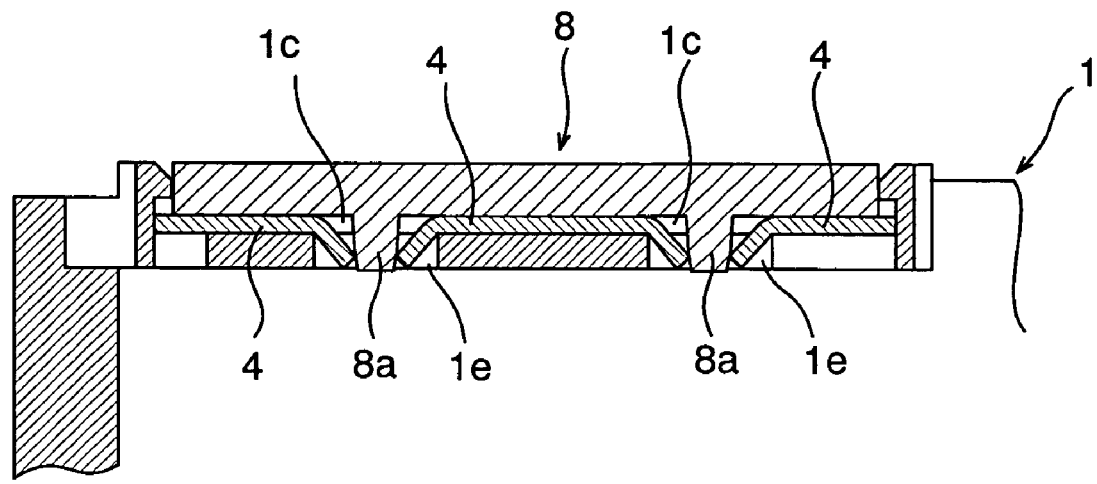
FIG. 5A is a cross-sectional view taken along the line F-F in FIG. 3 in a state in which an insulating member is fitted into a groove.
Figure 5B:
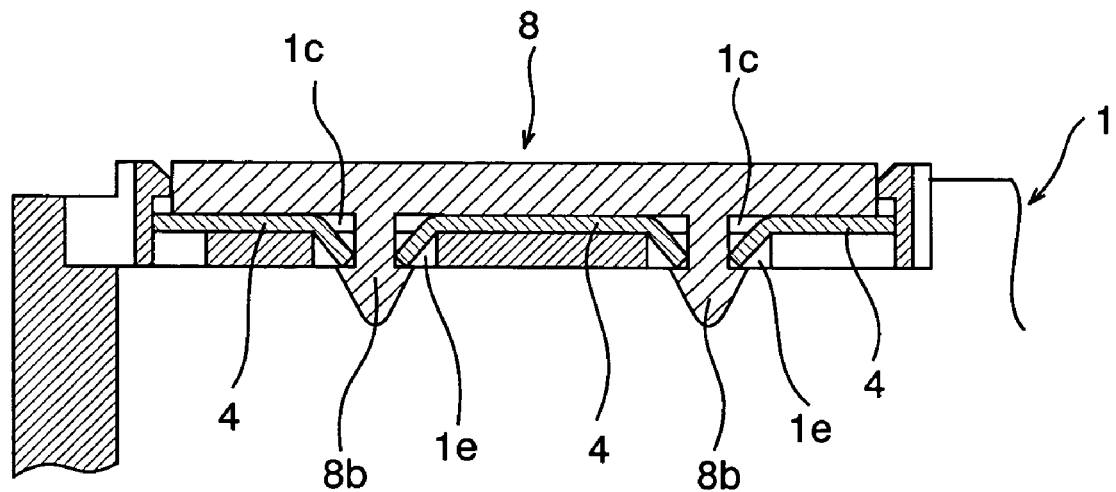
FIG. 5B is a cross-sectional view showing a case in which the shape of the projection of the insulating member is different.

The projection 8a formed on the insulating member 8 is not necessarily required to be a rod-shape as shown in FIG. 5A, but may be a projection 8b formed to have an acute-angled distal end and a constriction at a midsection thereof. With the projection 8b in this structure, since the distal end is acute-angled, insertion into the portion where the bus bars 4 are cut and bent upward is facilitated and, in the inserted state, since the constriction at the midsection thereof is engaged with the cut and bent upward distal end of the bus bar 4, fixation of the insulating member 8 is ensured, and hence the securement of the insulating member 8 is further enhanced.

What is claimed is:

1. A vehicle lamp assembly comprising:
a case formed of a low heat-resistant resin material which defines an interior space; the case including at least one partition wall defining a planar partition wall surface to partition the interior space respectively into one and another chambers, wherein the case defines an opening having opposed first and second open ends; the opening communicating with said one chamber;
wherein the vehicle lamp further comprises a bulb cassette received in the opening so as to close the first open end thereof and attached to the cassette case for accommodating a light bulb within said one chamber, and a lens which covers the second open end of the opening;
wherein the bulb cassette includes at least a first planar heat shield wall formed of a resin material having a heat resistance greater than the low heat-resistant resin material of the case, wherein the heat shield wall along its entire surface is in direct surface contact with the planar partition wall surface so as to shield the at least first partition wall and the other chamber from heat generated by the light bulb in the one chamber.

2. The vehicle lamp assembly of claim 1, wherein the bulb cassette includes a second planar heat shield wall spaced apart from said one planar heat shield wall so the light bulb is positioned therebetween, wherein the second planar heat shield wall is formed of a resin material having a heat resistance greater than the low heat-resistant resin material of the case.

3. The vehicle lamp assembly of claim 1, wherein the at least first planar heat shield wall is integrally formed with the bulb cassette.

4. The vehicle lamp assembly of claim 1, wherein the case is comprised of polypropylene resin.

5. The vehicle lamp assembly of claim 1 or 4, wherein the at least first planar heat shield wall is comprised of a nylon resin.

* * * * *